8316X
No Printed Specification Available
J. S. KITE.
Car Truck.
Patented July 14, 1834.
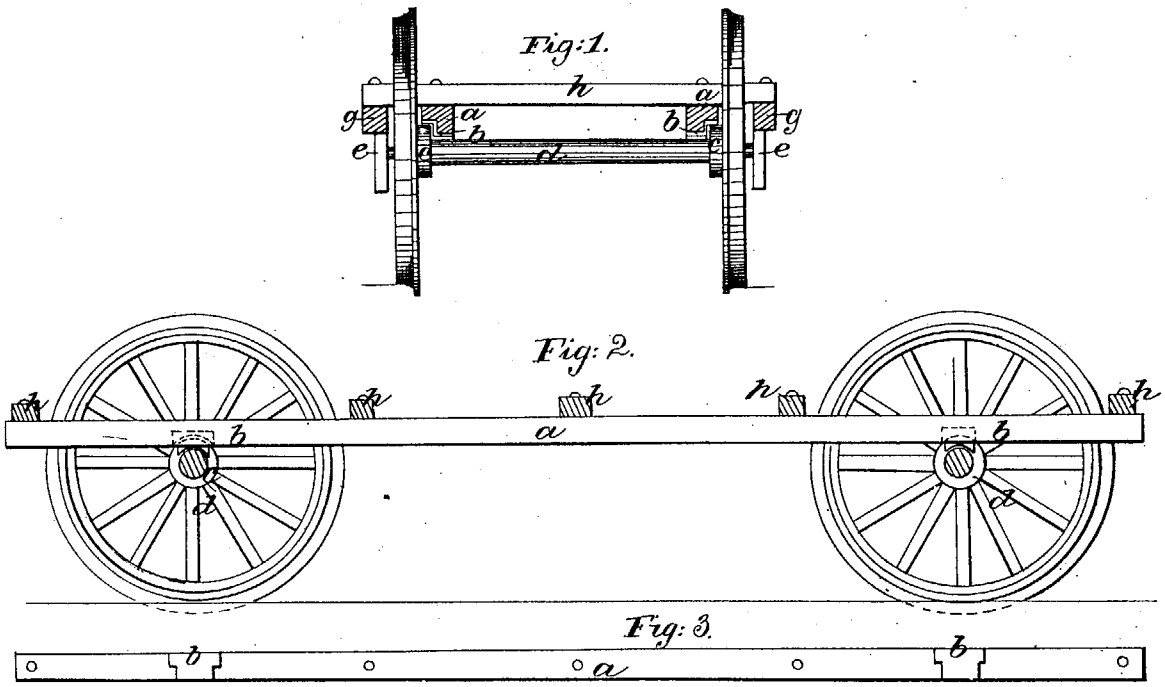
N. PETERS, PHOTO-LITHOGRAPHER, WASHINGTON, D. C.

July 14, 1836

Joseph S. Kite, of Phila. County. Penna.
Letters Patent 8316X

The Schedule referred to in these Letters Patent, and making part of the same, containing a description in the words of the said Joseph S. Kite himself, of his improvement in Rail Road Cars, by which the dangerous consequences of the breaking of their axles is prevented.

---

Wheras it not unfrequently happens that the axles of Rail Road cars, and of locomotive engines break asunder and in nearly every case the fracture takes place, close or near to the hub or nave of the wheel, and in consequence of such fracture, the axle, not being confined by its bearings falls, and the car or carriage upsets, now be it known that I, Joseph S. Kite of the County of Philadelphia, in the State of Pennsylvania, have devised a mode by which the wheels and axles of such cars or carriages are kept in their places notwithstanding such fracture, and that the following is a full, and exact description thereof — The cars wheels and axles, are in general to be constructed in the usual way, as now made with outside bearings, or boxes, for the ends of the axles to run in, which boxes, or bearings are sustained by String pieces making a part of the frame. but I place two additional String pieces, within the wheels there being one on each side, so situated that they may extend in part over the end of the hub, or naves, and in part over the axle; these additional string pieces I denominate safety beams as it is by their aid, that the intended effect is produced. they are firmly attached to the cross pieces, and make a part of the frame work of the carriage, each of these safety beams has boxes, or bearings, on its under side, which embrace and nearly touch both the hub and the axle, the part towards the wheel being adapted to the end of the hub, and the inner part to the axle. These boxes may be within one eighth of an inch, more or less from the hub and axles but are not to touch them, whilst the latter remains entire, but should it break, both the hub and the axle will find their bearings in the before named boxes, and the position of the vehicle will undergo but little sensible alteration, and may, in many cases continue to run, until it arrives at some place where it can be conveniently changed and in all cases, it will be prevented from breaking down.

Should cars, carriages, or locomotive engines, be used, with inside bearings the same principle may be applied to them, but in this case the safety beam must be applied to the outside of the wheels, and be furnished with boxes which will in case of the fracture of the axle embrace the outer ends of the hubs, provision being also made for sustaining their inner ends in a similar way. What I claim as my invention, and for which I ask a patent is the providing the additional boxes, or bearings, for the purpose of sustaining the wheels and axles of cars or carriages, running upon rail roads, whether these additional boxes or bearings are fixed precisely in the manner described, or in any other in which a similar effect is produced by analogous means.

Jos. S. Kite

Witnesses,
T. M. Rush
Danl. Hotz

Exd.
[illegible]

[559 [illegible]

(Drawings made from the Specification)
Patented July 14, 1834.